(12) United States Patent
Chakraborty et al.

(10) Patent No.: US 10,810,072 B2
(45) Date of Patent: Oct. 20, 2020

(54) SYSTEMS AND METHODS FOR MONITORING INPUT DATA AND MODEL SCORES IN ANALYTICAL MODELS FOR IOT (INTERNET OF THINGS) DEVICES

(71) Applicant: Honeywell International Inc., Morris Plains, NJ (US)

(72) Inventors: Sudip Chakraborty, Princeton Jct, NJ (US); Sovik Nath, Jersey City, NJ (US); Vaibhav Gedigeri, Cedar Knolls, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 110 days.

(21) Appl. No.: 15/956,862

(22) Filed: Apr. 19, 2018

(65) Prior Publication Data
US 2019/0324838 A1      Oct. 24, 2019

(51) Int. Cl.
*G06F 11/07*   (2006.01)
*G06N 5/04*    (2006.01)
*G06N 20/00*   (2019.01)

(52) U.S. Cl.
CPC ...... *G06F 11/0754* (2013.01); *G06F 11/0709* (2013.01); *G06N 5/04* (2013.01); *G06N 20/00* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,853,339 B2 * | 12/2010 | Miller | ......... | G05B 23/021 700/28 |
| 7,853,431 B2 * | 12/2010 | Samardzija | ......... | G05B 23/021 702/179 |
| 7,917,240 B2 * | 3/2011 | Samardzija | ......... | G05B 23/021 700/108 |

(Continued)

OTHER PUBLICATIONS

Sung-Hyuk Cha; Comprehensive Survey on Distance/Similarity Measures between Probability Density Functions; International Journal of Mathematical Models and Methods in Applied Sciences; Issue 4, vol. 1, 2007; pp. 300-307.

*Primary Examiner* — Amine Riad
(74) *Attorney, Agent, or Firm* — Bookoff McAndrews, PLLC

(57) ABSTRACT

Systems and methods are disclosed for monitoring models monitoring Internet-connected devices. Systems and methods include receiving, from an Internet-connected devices monitoring system, training data, the Internet-connected devices monitoring system being configured to predict future maintenance needs and/or failures of at least one Internet-connected device. Systems and methods further include receiving, from the Internet-connected devices monitoring system, production data associated with the at least one Internet-connected device, and determining that a data distance metric between the training data and the production data exceeds a first predetermined risk threshold. Systems and methods further include determining a risk level to be associated with the Internet-connected devices monitoring model based on the determination that the data distance metric exceeds the first predetermined risk threshold.

20 Claims, 15 Drawing Sheets

(56) References Cited

U.S. PATENT DOCUMENTS

| | | | |
|---|---|---|---|
| 8,014,880 B2* | 9/2011 | Samardzija | G05B 23/021 700/17 |
| 8,326,575 B1 | 12/2012 | Liu et al. | |
| 8,489,360 B2* | 7/2013 | Lundeberg | G05B 23/021 702/179 |
| 2014/0336791 A1* | 11/2014 | Asenjo | G05B 13/026 700/44 |

* cited by examiner

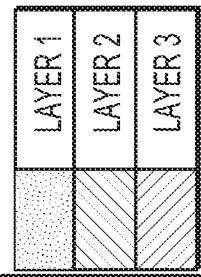

| THREE LAYERS FOR MODEL MONITORING FRAMEWORK | | PROJECTS WHERE GROUND TRUTHS NOT AVAILABLE | PROJECTS WHERE GROUND TRUTHS AVAILABLE |
|---|---|---|---|
| | | METRICS | METRICS |
| NON-CATEGORICAL | TIME DEPENDENT NC_TD | UNIVARIATE; JEFFREYS DIVERGENCE, HELLINGER DISTANCE | UNIVARIATE; JEFFREYS DIVERGENCE, HELLINGER DISTANCE; R2, RMSE, MAE |
| | NON-TIME DEPENDENT NC_NTD | UNIVARIATE; JEFFREYS DIVERGENCE, HELLINGER DISTANCE | UNIVARIATE; JEFFREYS DIVERGENCE, HELLINGER DISTANCE; R2, RMSE, MAE |
| CATEGORICAL | TIME DEPENDENT C_TD | UNIVARIATE; JEFFREYS DIVERGENCE, HELLINGER DISTANCE | UNIVARIATE; JEFFREYS DIVERGENCE, HELLINGER DISTANCE; CONFUSION MATRIX; ACCURACY, SENSITIVITY, SPECIFICITY, PRECISION, RECALL |
| | NON-TIME DEPENDENT C_NTD | UNIVARIATE; JEFFREYS DIVERGENCE, HELLINGER DISTANCE | UNIVARIATE; JEFFREYS DIVERGENCE, HELLINGER DISTANCE; CONFUSION MATRIX; ACCURACY, SENSITIVITY, SPECIFICITY, PRECISION, RECALL |

VARIABLE : CDD66
TYPE : NON-CATEGORICAL TIME-DEPENDENT

SUMMARY TABLE 600

605

610

| | TRAINING_DATA_SUMMARY | TIME_PERIOD | SCORING_DATA_SUMMARY | TIME_PERIOD |
|---|---|---|---|---|
| COUNT | 1534415 | 1 | 764935 | 1 |
| MEAN | -26.34847613 | 1 | -26.40826345 | 1 |
| STD | 9.32281851 | 1 | 9.539522366 | 1 |
| MIN | -48 | 1 | -43 | 1 |
| 25% | -32 | 1 | -33 | 1 |
| 50% | -26 | 1 | -29 | 1 |
| 75% | -19 | 1 | -19 | 1 |
| MAX | -1 | 1 | -1 | 1 |
| SKEWNESS | 0.199115644 | 1 | 0.647801588 | 1 |
| COUNT | 1411480 | 2 | 716438 | 2 |
| MEAN | -25.6012618 | 2 | -19.87454602 | 2 |
| STD | 11.00341593 | 2 | 9.643805715 | 2 |
| MIN | -45 | 2 | -34 | 2 |
| 25% | -34 | 2 | -26 | 2 |
| 50% | -25 | 2 | -22 | 2 |
| 75% | -21 | 2 | -13 | 2 |
| MAX | -1 | 2 | -1 | 2 |
| SKEWNESS | 0.457042158 | 2 | 0.569722287 | 2 |

FIG. 7

VARIABLE : CDD66
TYPE : NON-CATEGORICAL TIME-DEPENDENT

METRIC RESULTS TABLE 705

| | BANDS | SCORING POPULATION_A COUNTS | SCORING POPULATION_A | BASELINE_B COUNTS | BASELINE_B | A-B | ln(A/B) |
|---|---|---|---|---|---|---|---|
| 0 | (-14.0, INF] | 49469 | 6.46708544 | 123913 | 8.075586 | -0.01609 | -0.22212 |
| 1 | (-19.0, -14.0] | 123532 | 16.149346 | 173218 | 11.28886 | 0.048605 | 0.358063 |
| 2 | (-21.0, -19.0] | 24679 | 3.2262872 | 123996 | 8.080995 | -0.04855 | -0.91818 |
| 3 | (-25.0, -21.0] | 49421 | 6.4608104 | 148711 | 9.691707 | -0.03231 | -0.40552 |
| 4 | (-26.0, -25.0] | 49308 | 6.4460379 | 123781 | 8.066983 | -0.01621 | -0.22431 |
| 5 | (-29.0, -26.0] | 74113 | 9.68879709 | 173399 | 11.30066 | -0.01612 | -0.15389 |
| 6 | (-32.0, -29.0] | 148150 | 19.3676587 | 197774 | 12.88921 | 0.064784 | 0.407214 |
| 7 | (-35.0, -32.0] | 98835 | 12.9207057 | 148494 | 9.677564 | 0.032431 | 0.289021 |
| 8 | (-38.0, -35.0] | 73296 | 9.58199063 | 122914 | 8.01048 | 0.015715 | 0.179135 |
| 9 | (INF, -38.0] | 74132 | 9.69128096 | 198215 | 12.91795 | -0.03227 | -0.28739 |
| 0 | (-8.0, INF] | 98382 | 13.7321024 | 98382 | 6.970131 | 0.06762 | 0.678102 |
| 1 | (-17.0, -8.0] | 123641 | 17.257739 | 173239 | 12.27357 | 0.049842 | 0.340812 |
| 2 | (-22.0, -17.0] | 74144 | 10.3469765 | 98962 | 7.011222 | 0.033378 | 0.389376 |
| 3 | (-24.0, -22.0] | 74234 | 10.3615386 | 173381 | 12.28363 | -0.01922 | -0.17017 |
| 4 | (-25.0, -24.0] | 24724 | 3.45096156 | 24724 | 1.751637 | 0.016993 | 0.678102 |
| 5 | (-28.0, -25.0] | 222382 | 31.0399504 | 247224 | 17.51523 | 0.135247 | 0.572204 |
| 6 | (-34.0, -28.0] | 24736 | 3.45263652 | 148949 | 10.55268 | -0.071 | -1.11724 |
| 7 | (-36.0, -34.0] | 74195 | 10.356095 | 148645 | 10.53114 | -0.00175 | -0.01676 |
| 8 | (-39.0, -36.0] | 0 | 0 | 124145 | 8.795378 | -0.08795 | -inf |
| 9 | (-INF, -39.0] | 0 | 0 | 173829 | 12.31537 | -0.12315 | -inf |
| 0 | (-2.0, INF] | 98776 | 12.8833332 | 148361 | 9.668853 | 0.032145 | 0.287025 |

Columns: 710, 715, 720, 725, 727, 729

FIG. 7 (CONT.)

| JD 731 | TIME_PERIOD 733 | TOTAL_JD 735 | HELLINGER_DISTANCE | RISK METRICS 745 | RISK_METRICS_COLOR 750 | RISK_METRICS_CODE 755 |
|---|---|---|---|---|---|---|
| 0.003573 | 1 | 0.132613 | 0.1282679 | MEDIUM | YELLOW | 2 |
| 0.017404 | 1 | 0.132613 | 0.1282679 | MEDIUM | YELLOW | 2 |
| 0.044575 | 1 | 0.132613 | 0.1282679 | MEDIUM | YELLOW | 2 |
| 0.013102 | 1 | 0.132613 | 0.1282679 | MEDIUM | YELLOW | 2 |
| 0.003636 | 1 | 0.132613 | 0.1282679 | MEDIUM | YELLOW | 2 |
| 0.002481 | 1 | 0.132613 | 0.1282679 | MEDIUM | YELLOW | 2 |
| 0.026381 | 1 | 0.132613 | 0.1282679 | MEDIUM | YELLOW | 2 |
| 0.009373 | 1 | 0.132613 | 0.1282679 | MEDIUM | YELLOW | 2 |
| 0.002815 | 1 | 0.132613 | 0.1282679 | MEDIUM | YELLOW | 2 |
| 0.009273 | 1 | 0.132613 | 0.1282679 | MEDIUM | YELLOW | 2 |
| 0.045853 | 2 | 0.247373 | 0.3688922 | HIGH | RED | 3 |
| 0.016987 | 2 | 0.247373 | 0.3688922 | HIGH | RED | 3 |
| 0.012996 | 2 | 0.247373 | 0.3688922 | HIGH | RED | 3 |
| 0.003271 | 2 | 0.247373 | 0.3688922 | HIGH | RED | 3 |
| 0.015523 | 2 | 0.247373 | 0.3688922 | HIGH | RED | 3 |
| 0.077389 | 2 | 0.247373 | 0.3688922 | HIGH | RED | 3 |
| 0.079325 | 2 | 0.247373 | 0.3688922 | HIGH | RED | 3 |
| 2.93E-05 | 2 | 0.247373 | 0.3688922 | HIGH | RED | 3 |
| -inf | 2 | 0.247373 | 0.3688922 | HIGH | RED | 3 |
| -inf | 3 | 0.142993 | 0.287238 | HIGH | RED | 3 |
| 0.009226 | | | | | | |

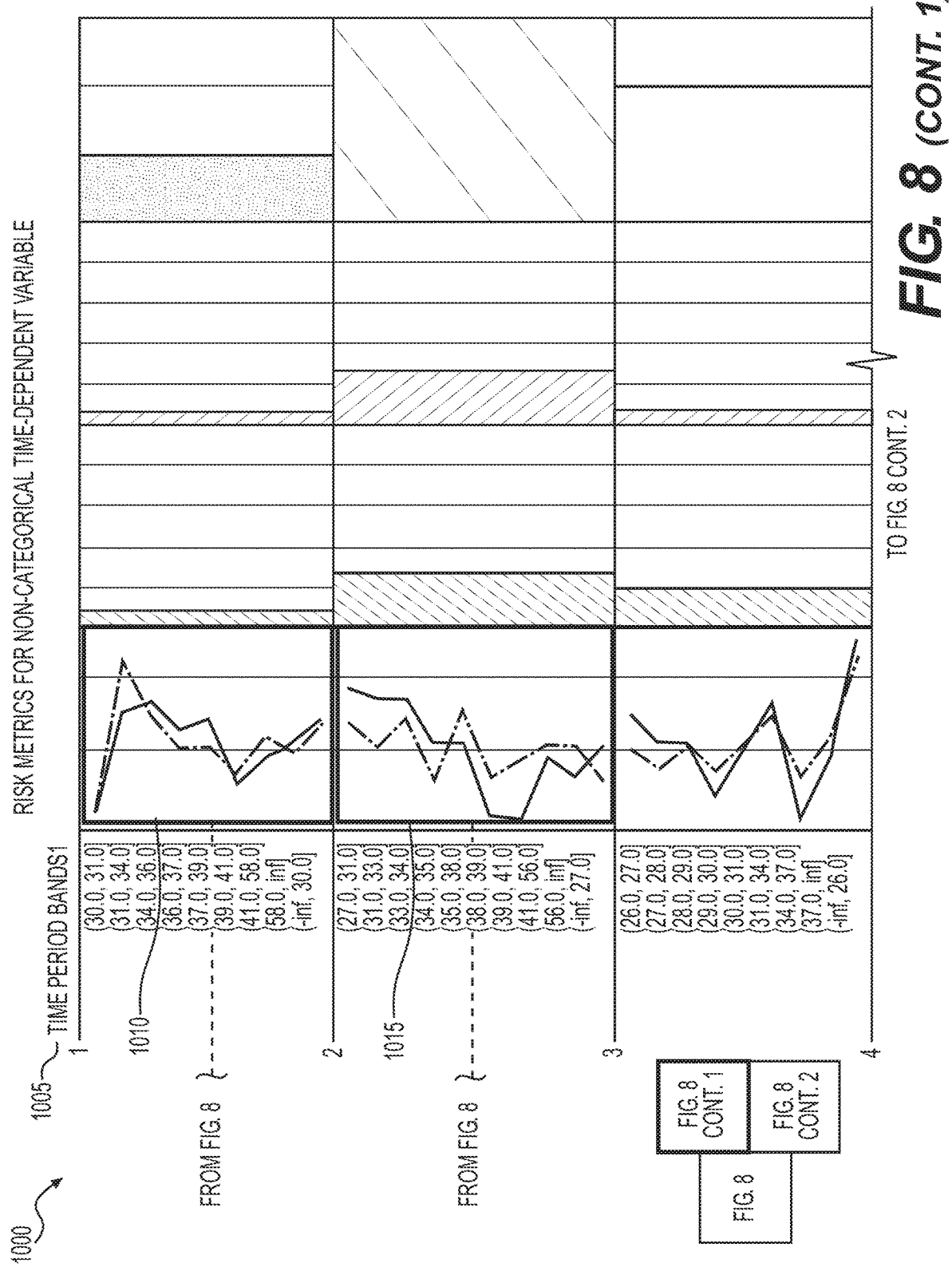
FIG. 8 (CONT. 1)

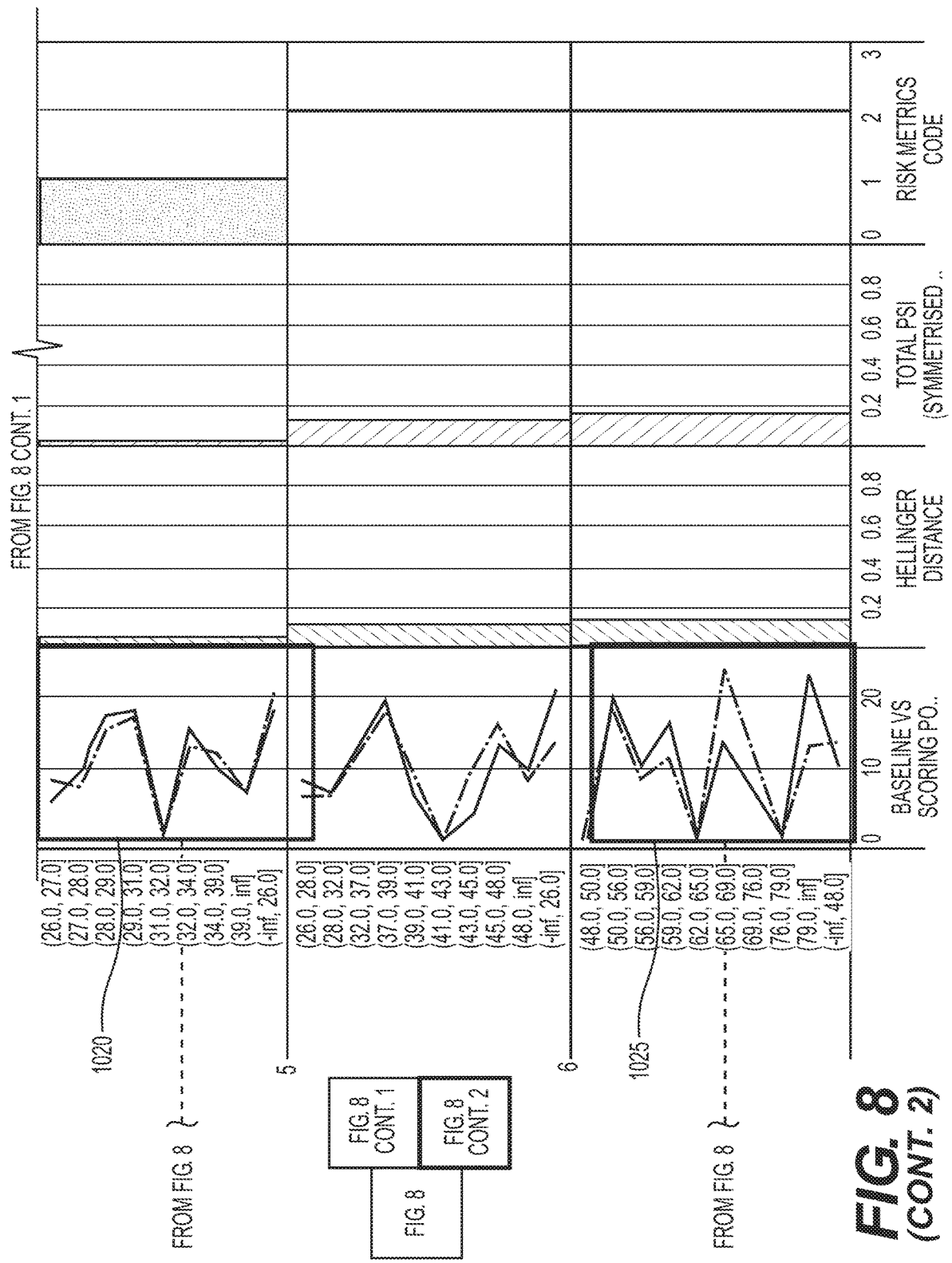
FIG. 8 (CONT. 2)

SYSTEMS AND METHODS FOR MONITORING INPUT DATA AND MODEL SCORES IN ANALYTICAL MODELS FOR IOT (INTERNET OF THINGS) DEVICES

TECHNICAL FIELD

Various embodiments of the present disclosure relate generally to monitoring Internet-connected devices and, more particularly, to monitoring input data and analytical scores of computer models that evaluate Internet-connected devices.

BACKGROUND

Devices, including industrial devices, are increasingly connected to networks, and may send and receive data. Devices may, for example, provide status data to a network, allowing for remote monitoring and fault detection. Networks of physical devices and appliances are sometimes called the "Internet of Things" (or "IoT"). The IoT may also be applied to industrial devices, and analytics may be employed to monitor these devices in what may be called the "Industrial Internet of Things" (or "IIoT").

In some cases, it may be desirable to better monitor and score Internet-connected devices, such as IIoT devices. The present disclosure is directed to systems and methods for addressing these goals and interests.

SUMMARY OF THE DISCLOSURE

According to certain aspects of the disclosure, systems, methods, and computer readable media are disclosed for monitoring models monitoring Internet-connected devices. Systems and methods may include receiving, from an Internet-connected devices monitoring system, training data, the Internet-connected devices monitoring system being configured to predict future maintenance needs and/or failures of at least one Internet-connected device. Systems and methods may further include receiving, from the Internet-connected devices monitoring system, production data associated with the at least one Internet-connected device, and determining that a data distance metric between the training data and the production data exceeds a first predetermined risk threshold. Systems and methods may further include determining a risk level to be associated with the Internet-connected devices monitoring model based on the determination that the data distance metric exceeds the first predetermined risk threshold.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a flowchart for monitoring analytics, according to techniques presented herein.

FIG. 6 depicts a table of model monitoring data, generated according to techniques presented herein.

FIG. 7 depicts a table of model monitoring data, generated according to techniques presented herein.

DETAILED DESCRIPTION OF EMBODIMENTS

Figure 1:
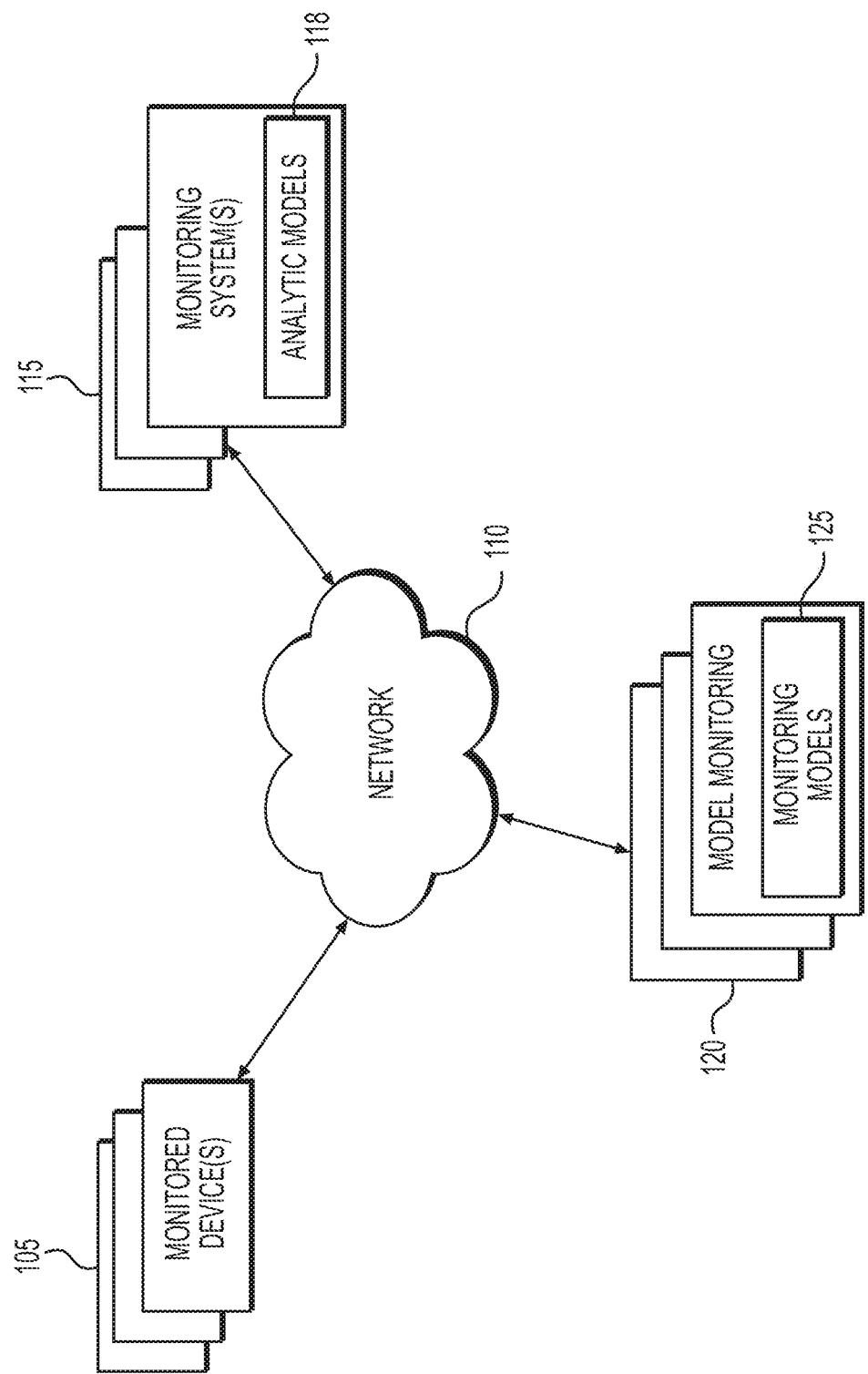
FIG. 1 depicts an exemplary system infrastructure for monitoring models that monitor devices, according to techniques presented herein.

Various embodiments of the present disclosure relate generally to monitoring Internet-connected devices and, more particularly, to monitoring input data and analytical scores of computer models that evaluate Internet-connected devices.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As discussed above, it may be desirable to better monitor and score Internet-connected devices, such as IIoT devices. Algorithms may be used to automatically monitor Internet-connected devices—these models may be called analytic models or analytical models. Such analytic models may detect a power outage, device failure, component failure, or one or more of a plurality of metrics that may indicate that the Internet-connected device, or some component therein, will soon fail and/or require servicing.

Analytic models may be trained using training data to predict coming failures or maintenance needs, but problems may arise if the training data is limited in scope, or if the analytic models are otherwise untrained or not prepared for the data received in the real world. Accordingly, techniques discussed herein disclose monitoring models that may be generated to monitor one or more analytic models.

Monitoring models may be used for monitoring a variety of analytic models, including IIoT analytic models. The analytic models of IIoT may have a variety of different purposes, such as predicting furnace flooding, nontechnical loss in energy consumption, predicting the life cycle of auxiliary power units (APUs), and failure prediction of rooftop heating, ventilation, and air conditioning systems (HVAC). Each IIoT analytic model is developed for a specific type of problem for a specific type of physical asset. This increases the challenge of monitoring analytic models. Given the variety of the IIoT analytic models, creating a unified data-driven framework for monitoring is a challenge. Techniques presented herein may be a unified framework that may be applied regardless of the IIoT analytic model, and regardless of the device being monitored. These techniques may be a standard scale that ensures that these challenges are overcome. The framework described herein may be a data-driven framework that may allow performance monitoring of IIoT monitoring models based on a small number of metrics, and with minimal computation cost and time.

As a result of techniques presented herein, it may be determined whether to continue to use the analytic models if and when there are changes in the production environment. It may also be determined if the analytic models require retraining, or require new features. If the analytic models are applied to different business applications or segments, it may be determined whether there are modifications needed to apply the analytic models. Further, if a marketing team decides to apply new analytic models to new customers, markets or locations, techniques described herein may be used to determine whether changes to the analytic models are required. Further, techniques disclosed herein may be used to determine if there are changes in production data due to unseen events like regulatory changes. Thus, techniques described herein improve the technical field in a variety of ways.

Analytics may be deployed when monitoring devices in a diverse set of situations, including when devices are connected to the cloud. Analytical algorithms may be used for predictive maintenance, non-technical loss (NTL) detection, for example in utilities, furnace failure prediction, etc. While these and other example monitored devices are provided, techniques discussed herein may be practiced with any Internet-connected device, including any Internet of Things (IoT) devices, or Industrial Internet of Things (IIoT) devices.

Once analytical models are developed and deployed, however, performance may degrade for a number of reasons. For example, changes in input data characteristics of production data, changes in external conditions, etc., may all cause model performance degradation. If the input data characteristics change beyond a certain amount, continuing to use the analytical model may introduce risks. For example, the analytical model may fail to predict needed maintenance activities on a machine or equipment, which could result in equipment failure or downtime. In techniques discussed herein, the input data that the models are operating on, as well as model outputs, and model performance, may be monitored to ensure that these are within tolerable ranges. Techniques presented herein may allow for risk management and ensuring that appropriate personnel and/or systems are alerted or notified when input data and/or output data deviate from expected distributions beyond predetermined thresholds.

Techniques discussed herein may be used to effectively monitor Internet-connected devices, including IoT or IIoT devices. A variety of IIoT models may be able to be monitored in production. Measures and risk metrics for data driven model monitoring may be determined. Model monitoring techniques described herein may further be automated in a cloud environment. Further, analytic models may be monitored in a data-driven manner that may automate the process with statistical measures.

As shown in FIG. 1, monitored device(s) 105 may communicate with monitoring system(s) 115 across one or more network(s) 110. Monitoring systems 115 may execute analytic models 118 that monitor the status of the monitored devices 105, which may be, for example, IoT or IIoT devices. Analytic models 118 may in turn be monitored by model monitoring system(s) 120, which may have one or more monitoring models 125 operating thereon. Although depicted as physical separate systems in FIG. 1, monitoring models 125 may be housed on the same physical or logical device as analytic models 118, and may be operating on one or monitored devices 105, or monitoring systems 115.

As will be discussed further herein, input data, output data, and model performance may be monitored. A variety of statistical distances may be employed by the monitoring models 125 for detecting data deviations that exceed one or more predetermined thresholds, and hence that may threaten the integrity of one or more analytical models 118. One technique may use Jeffrey's Divergence as the statistical distance. Other techniques may use a Hellinger Distance. Still other techniques may employ a combination of statistical distances. For example, a Hellinger Distance and a Jeffrey's Divergence may be combined in a cross-tab manner for monitoring IIoT analytic models for robust detection of dissimilarities. A cross-tab technique may involve a transformation of rows of data into columns, for example using aggregation of data broken down by different statistical difference techniques by row and column. Using these techniques, one or more analytic models 118 may be monitored within a unified data-driven framework. Statistical distances may be applied by monitoring models 125 for standardizing a scale of measuring risk for monitoring, for example, IIoT analytic models 118.

Figure 2:
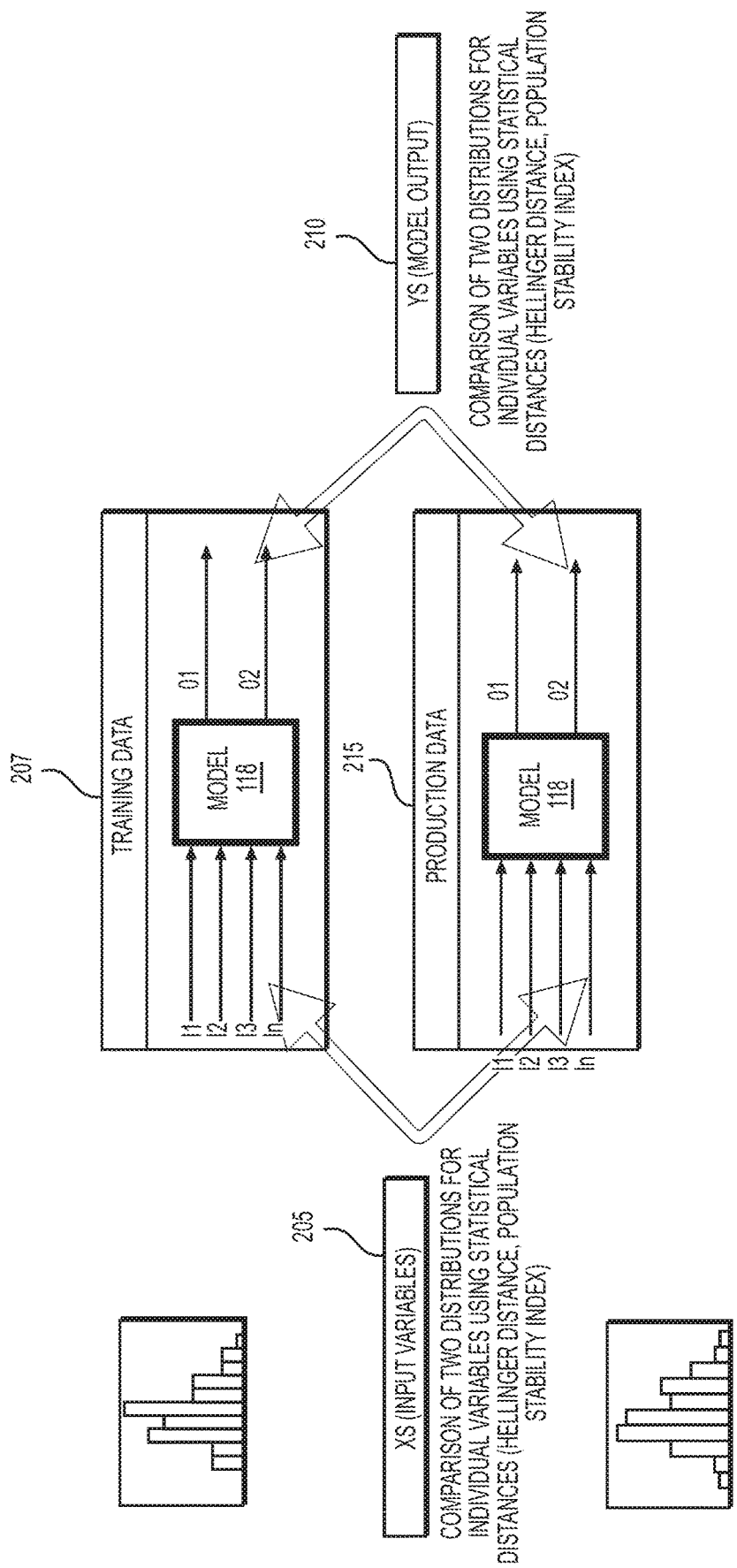
FIG. 2 depicts a flowchart of a method of training monitoring models that monitor devices, according to techniques presented herein.

As shown in FIG. 2, monitoring models 125 may be used to compare the training data 207 used to train analytic models 118 with the real-world production data 215 being provided to the analytic models 118. The input data 205 may comprise one or more variables that may be provided as inputs i1, i2 . . . in to one or more analytic models 118. One or more monitoring models 125 may compare distributions of training vs production input data for individual variables using one or more statistical distances. For example, a Hellinger's Distance, Population Stability Index, and/or Jeffrey's Distance may be determined. The monitoring models 125 may also compare distributions of output data 210 of training vs production environments for individual variables using statistical distances. A comparison of the similarity between development and production conditions may be accomplished independent of the underlying model algorithms. Since the metrics may work directly on the type of data, the algorithm underlying may remain as-is without the need for inspection of the algorithm. Techniques described herein may allow the model monitoring framework to be independent of the underlying analytic model. The framework may instead depend on the variables (production data) and the model output. The metrics determined using techniques described herein may also be independent of the model types. The metrics may instead depend on the types of variables (input and model output) used. The results of the statistical distance determinations may be quantitative values corresponding to how similar (or dissimilar) the distribution of the production data (both input and/or output) are from the distribution of the training data (both input and/or output). The statistical distances applied to the input data 205 may or may not be the same as the statistical distances applied to the output data 210. Once statistical distances are obtained, risk metrics may be determined based on the statistical distances, as will be further discussed below.

The analytic models 118 may output data 210, which may comprise one or more variables and/or data streams o1, o2 . . . on. In the production environment 215, analytic models 118 may be expected to perform to only a certain level of reliability, and may be able to provide usable results only if the data the analytic models 118 use are sufficiently similar to the data with which each respective model was trained.

Figure 3:
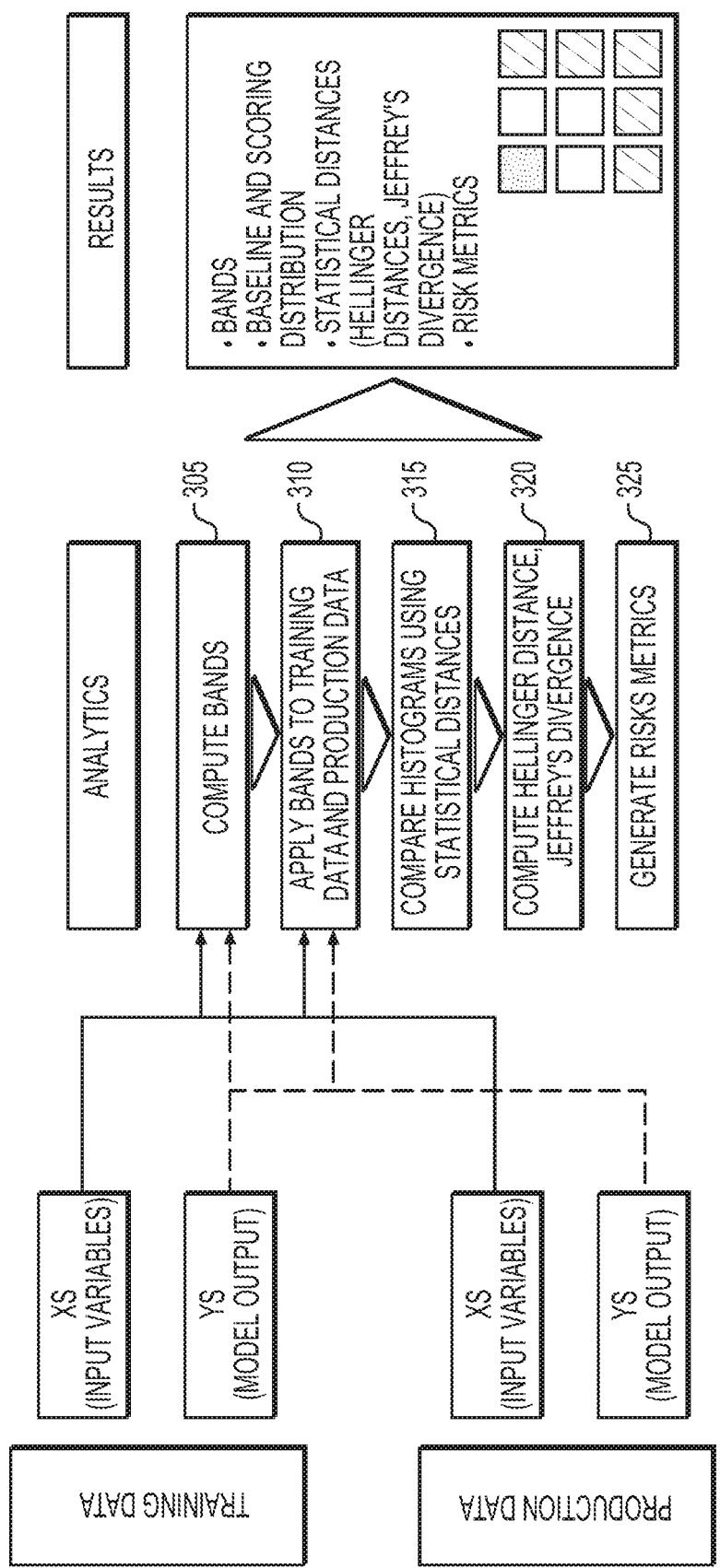
FIG. 3 depicts a chart of a framework of model monitoring techniques, according to techniques presented herein.

Currently, there are no established methods for monitoring IIoT analytic models 118. An example solution is shown in FIG. 3, which depicts a flowchart for monitoring analytic models according to techniques presented herein. FIG. 3 depicts a three-stage process for monitoring analytics, which may comprise data inputs, analytics, and results. At step 305, data bands (ranges) may be determined for the input and/or output training data, as well as the input, and/or output production data. For example, the user may select or designate percentile ranges into which the training data would be divided. The bands may be generated based upon this user designation. Alternatively, the bands may be predetermined. At step 310, the bands may be applied to the input variables and/or output data of the training data and/or the production data to determine one or more histograms for each input variable and/or output variable. At step 315, the training and production histograms of each input variable and/or output variable may be compared using one or more statistical distances.

At step 320, the statistical distances may be computed, for example using Hellinger's Distance and/or Jeffrey's Divergence. This is to say that, for a given variable, the statistical distances may be determined between the training and production data. Distances (and similarities) are quantitative measures that describe how close two statistical objects are. Statistical distances allow direct use of data sets without assuming any standard probability distribution. Other statistical distances used with techniques discussed herein may include a Linear Correlation Coefficient, and Symmetrised Kullback-Liebler. Statistical distances used alone, or in combination, with techniques discussed herein may further include the Lp Minkowski family (e.g., Euclidean, City Block, Minkowski, Chebyshev), the L1 family (e.g., Sorensen, Gower, Soergel, Kulczynski, Canberra, Lorentzian), the Intersection family (e.g., Intersection, Wave Hedges, Czekanowski, Motyka), the Inner Product family (e.g., Inner Product, Harmonic Mean, Cosine), the Fidelity family or Squared-chord family (e.g., Fidelity, Bhattacharya, Hellinger), The Squared L2 family or χ2 family (e.g., Squared Euclidean), and/or the Shannon's entropy family (e.g., Kullback-Leibler, Jeffrey).

The Hellinger Distance may be defined as:

$$d_H = \sqrt{2 \sum_{i=1}^{d} (\sqrt{P_i} - \sqrt{Q_i})^2}$$

Variable P may correspond to the binned version of data, such as the production data. Variable Q may correspond to another set of binned version of data, such as the training/development data. In the above equation, P and Q may be scaled to be between 0 and 1. The Hellinger Distance may be useful because it is bounded, which may thereby provide a scale and standard. The resulting distance is a number between 0 and 1 when divided by √2. This value may accordingly provide a reference scale. The distribution may give comparatively higher decimal values for small differences in two distributions. As a result, the Hellinger Distance may detect vulnerabilities in monitoring models quite sensitively. One possible drawback is that the Hellinger Distance may be difficult to demarcate when there are missing values in particular bands.

Another statistical distance that may be used with techniques presented herein is the Symmetrised Kullback-Liebler, Jeffrey's Divergence, and/or the Population Stability Index (PSI). The Jeffrey's Divergence may be defined as:

$$d_J = \sum_{i=1}^{d} (P_i - Q_i) \ln \frac{P_i}{Q_i}$$

In the above equation, P and Q may be scaled to be between 0 and 1. A useful attribute of this distance is that a +Infinity value occurs if there is a missing value in the bands. This may account for the missing value and provide a strong indication as soon as there is a missing value in the bands of, e.g., the production data. The distribution may give comparatively higher decimal values for larger differences between two distributions. This may be useful because it may provide a strong indication in the case of a larger difference between the production and the development/training data. As a possible drawback, the results may be unbounded, and may range from 0 to +Infinity, though in practice, values higher than 10 may be uncommon.

At step 325, risk metrics may be determined based on the computed distances. Risk metrics may be derived based on user-defined rules that may be associated with a combination of two or more measures of statistical distances, such as the Hellinger Distance and Jeffrey's Divergence.

Once risk metrics are determined, risk alerts may be generated if the risk metrics exceed predetermined values, such as a variance that exceeds one or more predetermined thresholds, or predetermined deviation of statistical significance. For example, a low risk or green risk metric may be determined if the divergence metrics are below a first predetermined threshold. A high or red metric may be determined if the divergence metrics are above a second predetermined threshold. A medium or yellow risk metric may be determined if one or more of the determined risk metrics fall in between the first predetermined threshold and the second predetermined threshold. Accordingly, results may include computed bands, baseline and scoring distribution, statistical distances, and/or risk metrics. Percentage counts for baseline and scoring populations may be scaled between 0 and 1.

FIG. 4 depicts a chart of a framework of model monitoring techniques, according to techniques presented herein. Techniques discussed above may be applied differently based upon input or output variable types. In particular, the monitoring framework may be developed in three steps, or layers, for identifying the variables and risk metrics. As a first step, or first layer, projects may be differentiated based on the availability of ground truth data. The projects in this case may refer to the data science and analytics projects. Ground truth data may refer to data containing instances of the variable to be predicted. Additional metrics may be applied based on the availability of ground truth data, which may allow for increased accuracy in the risk metrics. As a second step, or second layer, variable types may be divided by whether they are categorical or non-categorical. Categorical variables may be binary, while non-categorical variables may be divided into bands (data ranges). Variables being categorical or non-categorical may affect the processing that may be applied to generate the most accurate risk metrics. As a third step, or third layer, variables may be separated into time dependent or non-time dependent. Time dependent variables may be evaluated in a plurality of time segments. These differentiations may be applied to both the input as well as output variables of the analytic models 118. The metrics applied in the table of FIG. 4 are exemplary, and other metrics may be used.

As an example, a variable that has ground truth data availability, and is non-categorical and time dependent, may have a variety of metrics applied including a univariate analysis, Jeffrey's Divergence, Hellinger Distance, R-squared ($R^2$), root-mean-square error (RMSE), and/or Mean Absolute Error (MAE). These metrics might not be applicable if the ground truth data is not available. As another example, a variable that has ground truth data availability, and is categorical and non-time dependent, may have a variety of metrics applied or determined including a univariate analysis, Jeffrey's Divergence, Hellinger Distance, a confusion matrix, accuracy, sensitivity, specificity, precision, and/or recall metrics. A confusion matrix may be a table that assesses the performance of a classification on a given set of evaluation data for which the ground truth values are known.

This framework is thus applicable for monitoring different IIoT projects and analytic models serving various purposes, independent of the rule or algorithm or machine learning method applied to the models. Transformed data may be used directly by the models. These techniques might not need to be applied to all variables in order to achieve effective risk metric determination. Instead, only a few key performance metrics (KPIs) may be monitored. Standardizing risk metric determination may also allow for standardizing an alert system, which may require a small number of thresholds and/or rules. Trends and/or predictive analytics may be possible. These techniques may be implementable manually, for example using a refining process that uses a software control system. These techniques may further be applied to high-level models as well as individualized models based on the resolution desired. These techniques may also be applied to multiple types of analytic models, for example regression models and/or classification models. These techniques may also allow for the monitoring of real-time analytics models, may allow for time series analysis, but might not be applicable to in-applicable to geospatial distributions (Euclidean distance).

Figure 5:
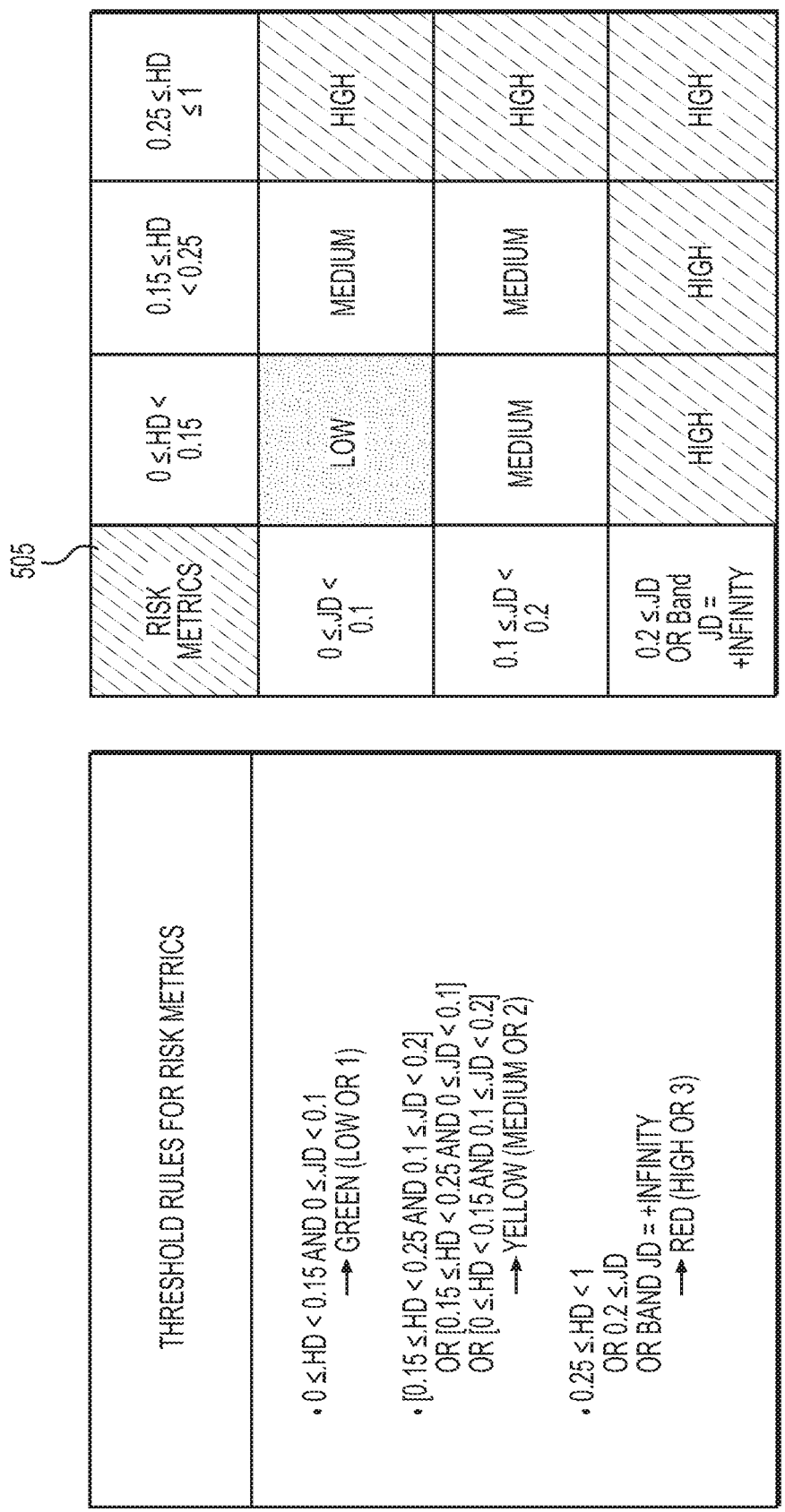
FIG. 5 depicts a chart of example tier thresholds for risk metrics, according to techniques presented herein.

FIG. 5 depicts a chart of example tier thresholds for risk metrics, according to techniques presented herein. Using determined statistical distances, such as a Jeffrey's Divergence and/or Hellinger's Distance, risk measures may be determined and categorized. A multi-dimensional risk matrix 505 may also be generated based upon the number of divergences applied. Additional dimensions are possible, where three or more statistical metrics may be placed into an n-dimensional vector. For example, if four statistical metrics are applied to a given analytic model variable, a four-dimensional vector may be generated for determining risk categorization.

As an example, if a Jeffrey's Divergence and Hellinger's Distance are both below 0.1 and 0.15, respectively, the risk metric may be a green, or low-risk, categorization. If the Jeffrey's Divergence is between 0.1 and 0.2, and/or the Hellinger's Distance is between 0.15 and 0.25, the risk metric may be a yellow, or medium-risk, categorization. If the Jeffrey's Divergence is greater than 0.2 and/or the Hellinger's Distance is above 0.25, the risk metric may be a red, or high-risk categorization. If band data is missing, an infinity value may be present, and may automatically cause a high-risk designation. The rules of table 505 are exemplary, and the actual threshold values and statistical distances used may vary.

Actions to be taken based on determined risk metrics may be determined by the user. For example, a solution architect, data scientist, stakeholder and/or strategic business group (SBG) may determine actions to be taken based on the application of the models for one or more business purposes. While three risk levels are presented above, the number of risk levels, and the predetermine thresholds associated therewith, may vary.

FIG. 6 depicts a summary table 600 of example model monitoring data, generated according to techniques presented herein. The variable type may be, in this case, a non-categorical time-dependent variable called "cdd66." The training data shown in column 605, and metrics associated therewith, such as mean, standard deviation, minimum, max, skewness, etc., may be compared with the production data shown in column 610, and metrics associated therewith. Variable cdd66 may be a derived variable and may quantify some need, for example the energy demand to cool a building.

FIG. 7 depicts an example table 700 of model monitoring data, generated according to techniques presented herein. The example data table is for a non-categorical time-dependent variable. For each segment of time 733, different bands (data ranges) 705 of values may be determined for a given variable. The variable may be input and/or output data of one or more analytic models 118. Table columns may include PSI or bands of Jeffrey's distance, time period (the point of measurement in time), total PSI or total Jeffrey's divergence, Risk Metrics based on a crosstab of Jeffrey's distance and, for example, a Hellinger Distance, the color assigned to each type of risk metric alert, and/or a risk metric color indicating a severity of risk. For each band in each time period, one or more statistical distances may be determined, such as the Jeffrey's distance (or Population Stability Index) 735 and/or the Hellinger's Distance 740. Based on the values of the statistical distances, a risk metric 745 may be determined. The risk metric 745 may correspond to a risk color 750 and/or a risk code 755.

Figure 8:
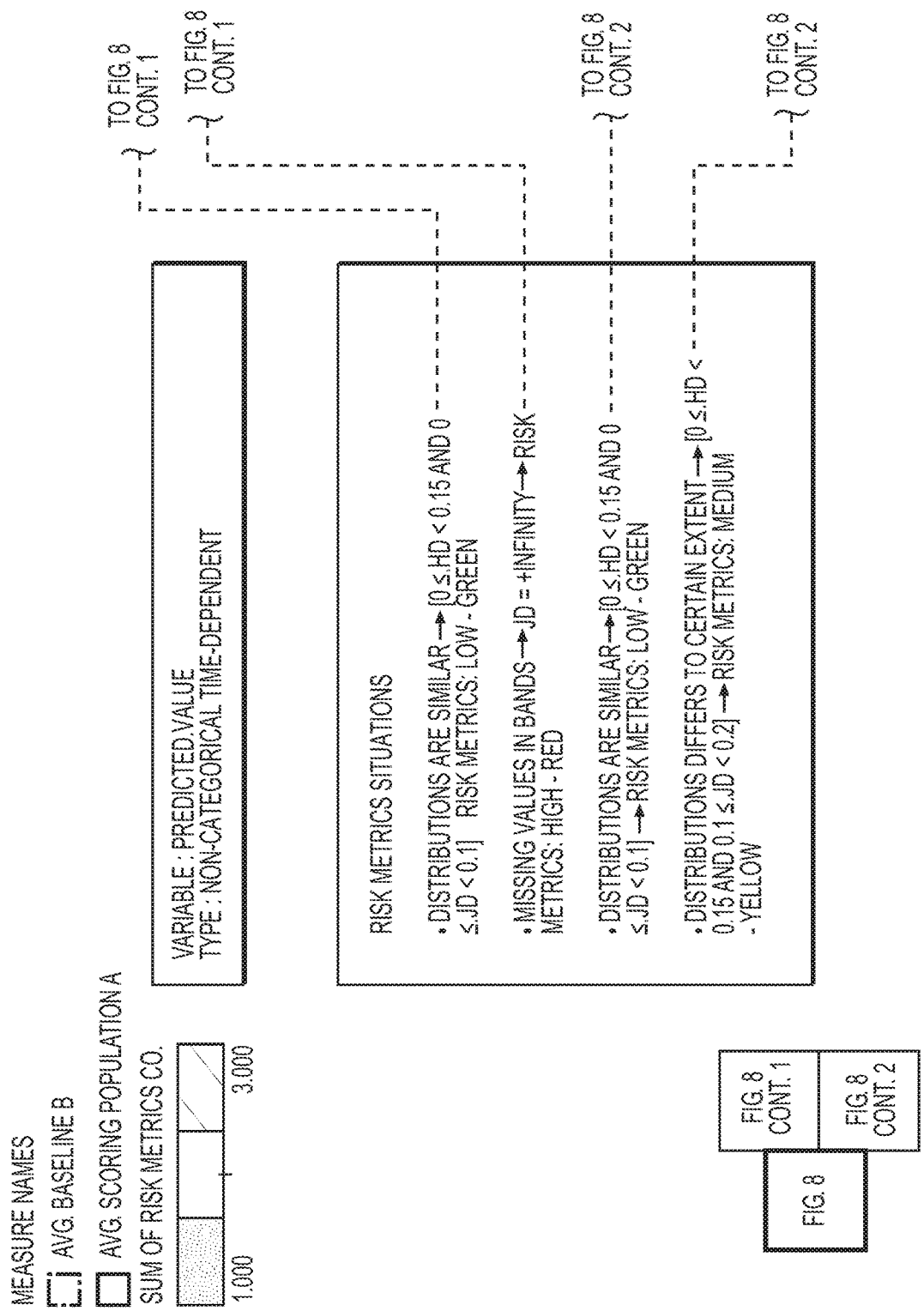
FIG. 8 depicts a graph of model monitoring data over time, according to techniques presented herein.

FIG. 8 depicts an example graph 1000 of model monitoring data over time, according to techniques presented herein. This example shows a graph for a non-categorical time-dependent variable. The graph lines may correspond to average training data (baseline B) values, and average production data (scoring population A) values. For each time period 1005, in this case time periods 1-6, the data range bands may be graphed for the training data and production data. In the graph for a time period, the statistical distances between training and production data may differ above a lower threshold and below an upper threshold. As a result, the risk level may be assigned to medium, which may correspond to a color of yellow and a risk code of 2. In the graph for a time period, the data may contain missing values, causing the statistical distance to register as +infinity. As a result, the risk level may automatically be assigned to high, which may correspond to a color of red and a risk code of 3. In the graph for a time period, the distributions may be similar and below any thresholds for statistical distances that may be applied. Accordingly, a risk level may be assigned to low, which may correspond to a color of green and a risk code of 1. In the graph for a time period, the distributions may be dissimilar above a threshold for at least one applied statistical distance. For example, the Jeffrey's Divergence may be higher than 0.2. As a result, the risk level may be assigned to high, corresponding to a color of red and a risk code of 3.

Another graph for a non-categorical time-dependent variable may be composed, for example, with a variable named "kwh." For each time period, the data range bands may be graphed between the training data and production data (baseline and scoring data). In the graphs for other time periods, all statistical distances applied may be below any thresholds of risk. As a result, the variable "kwh" may be assigned a low risk metric for all time periods. A low risk metric may correspond to a color of green, and a risk metric code of 1.

Another graphed variable, in this case called "predicted. value", may be a non-categorical time-dependent variable. For each time period 1005, in this case time periods 1-6, the data range bands may be graphed between the training data and production data (baseline and scoring data). In the graph for time period 1, shown in box 1010, the statistical distances between training and production data may be below any thresholds for any statistical distances applied. As a result, the risk level may be assigned to low, which may correspond to a color of green and a risk code of 1. In the graph for time period 2, shown in box 1015, at least one statistical distance function may be missing data, which may automatically cause the assessed risk value to be set to high. In the graph for time period 4, shown in box 1020, the statistical distances between training and production data may be below any thresholds for any statistical distances applied. As a result, the risk level may be assigned to low, which may correspond to a color of green and a risk code of 1. In the graph for time period 6, shown in box 1025, at least one of the statistical distances between training and production data may be between a lower and an upper threshold. As a result, the risk level may be assigned to medium, which may correspond to a color of yellow and a risk code of 2.

Figure 9:
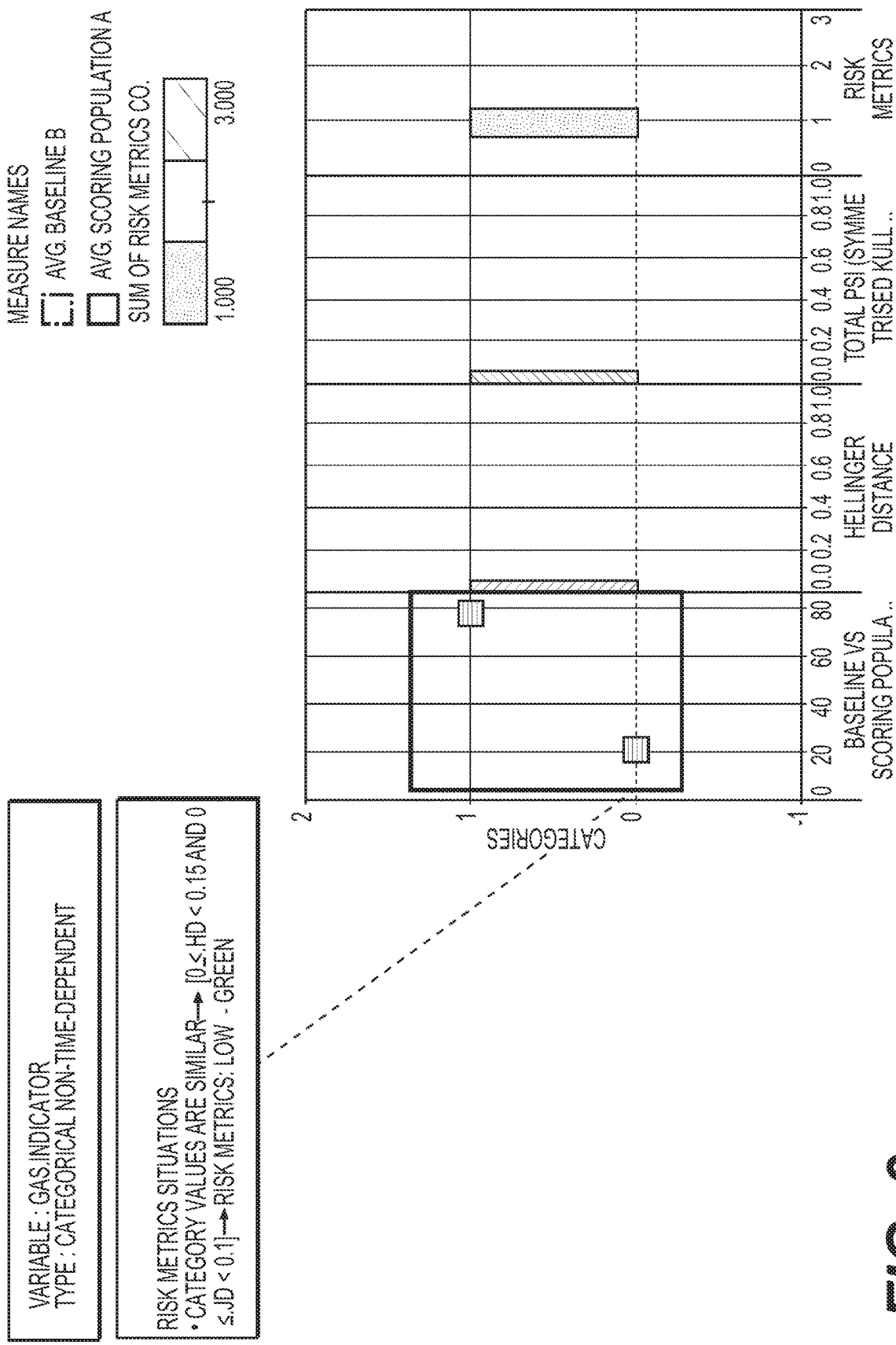
FIG. 9 depicts a graph of model monitoring data over time, according to techniques presented herein.

FIG. 9 depicts an example graph 1100 of model monitoring data over time, according to techniques presented herein. The variable, in this case called "gas.indicator", may be a categorical non-time-dependent variable. Since the variable is not time dependent, the graph 1100 might not be broken up into time periods. Since the variable is categorical, the variable values might not be broken up into bands. If the category values are similar such that any statistical distance applied is below any threshold of risk, the variable may be assigned a risk metric of low, which may correspond to a color code of green and a risk metric code of 1.

Figure 10:
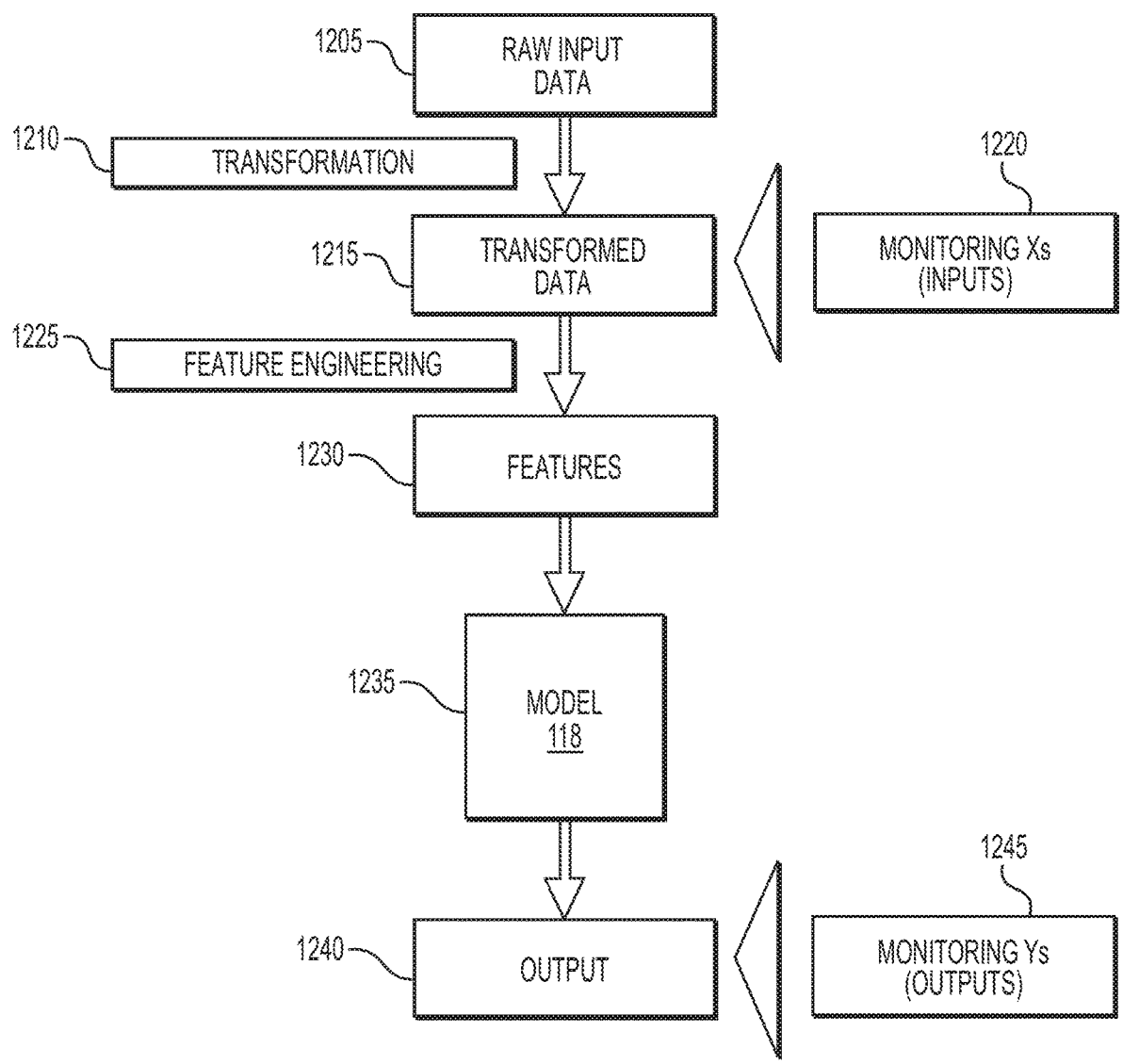
FIG. 10 depicts a flow chart for techniques of model monitoring, according to techniques presented herein.

FIG. 10 depicts a flow chart for techniques of model monitoring, according to techniques presented herein. At step 1205, raw input data may be received, for example at the monitoring systems 115, from the monitored devices 105. The monitoring systems 115 may apply one or more transformations 1210 to the raw data to produce transformed data at step 1215. At step 1220, the monitoring models 125 may be monitoring the raw and/or transformed data. The monitoring systems 115 may engage in feature engineering a step 1225 to extract features at 1230 to provide to one or more analytic models 118 at step 1235. At step 1240, the monitoring systems 115 may produce output data. The output data may also or alternatively be monitored by the monitoring models 125 at step 1245. Inputs, features, variables and/or metrics determined in the steps above may include training (development) data, variables (input and output) to be monitored, types of variables (categorical or non-categorical, time dependent, etc.), bin depths (percentile, quartile), ground truth availability, severity metrics, priority of variables in case of severity metrics, and/or actions to be taken based on risk metrics (to be determined by users, such as solution architects). Some or all of these data types may be monitored by monitoring models 125 to perform techniques discussed herein.

Figure 11:
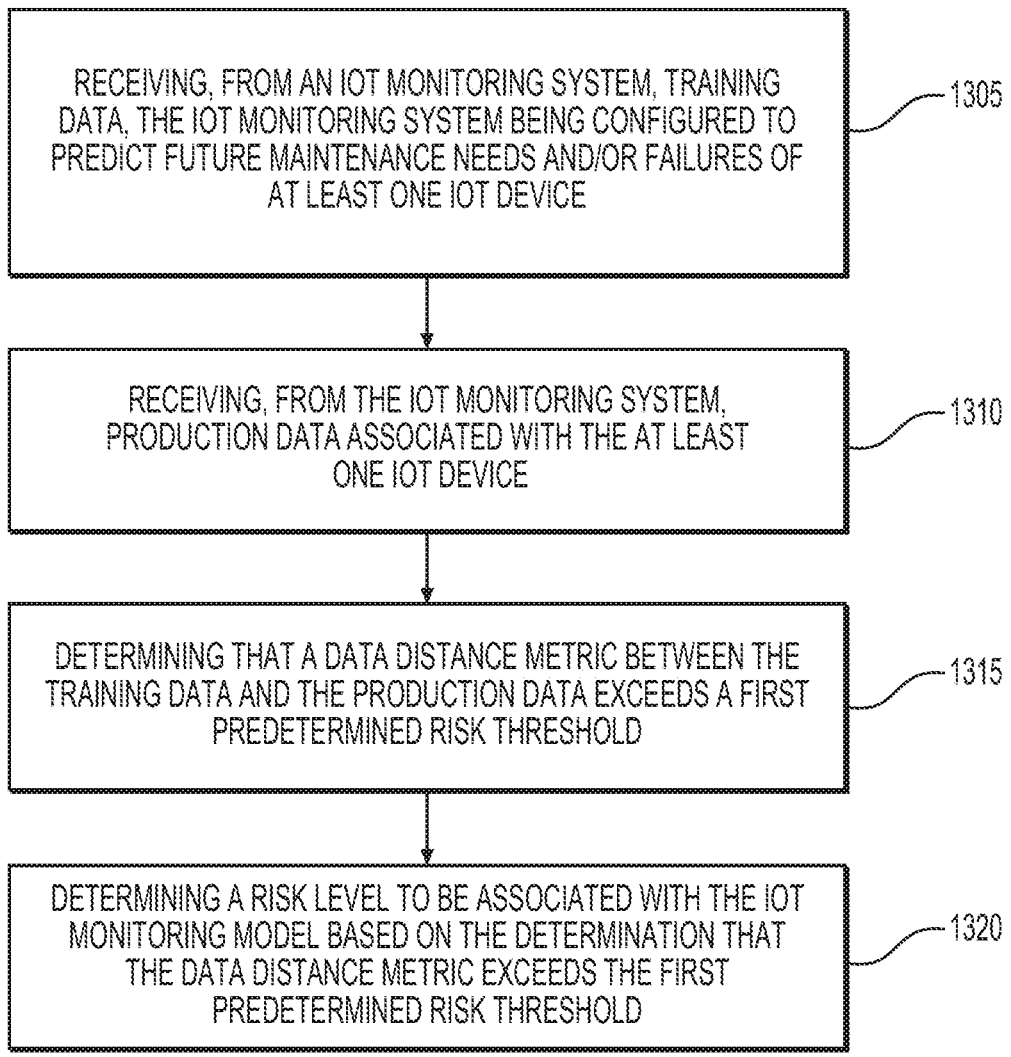
FIG. 11 depicts a flow chart for techniques of model monitoring, according to techniques presented herein.

FIG. 11 depicts a flow chart for techniques of model monitoring, according to techniques presented herein. At step 1305, training data may be received, by an Internet of Things (IoT) monitoring model, the IoT monitoring model being configured to predict future maintenance needs and/or failures of at least one IoT device. At step 1310, production data may be received, by the IoT monitoring model, associated with the at least one IoT device. At step 1315, a deviation may be determined, by the IoT monitoring model, between the training data and the production data that exceeds a predetermined threshold. At step 1320, a risk level may be determined to be associated with the IoT monitoring model based on the determination of the deviation exceeding the predetermined threshold.

The Application Programming Interface, which may be a Spark Python API (PySpark) code, may be extended to accommodate multiple variables, metrics, and risk metrics. Further, a plurality of analytic models may run simultaneously with a plurality of variables while in production mode. When a larger number of analytic models are running and monitoring in production mode, a severity ranking may be developed to rank metrics for actions. Further, the model monitoring framework may be productized in a sentience platform using platform engineering. This framework may be integrated within the sentience framework as an application layer for end-to-end monitoring purposes of the IIoT analytic models. Finally, using techniques presented herein, an alert system may be implemented if a determined risk is above a predetermined threshold.

Figure 12:
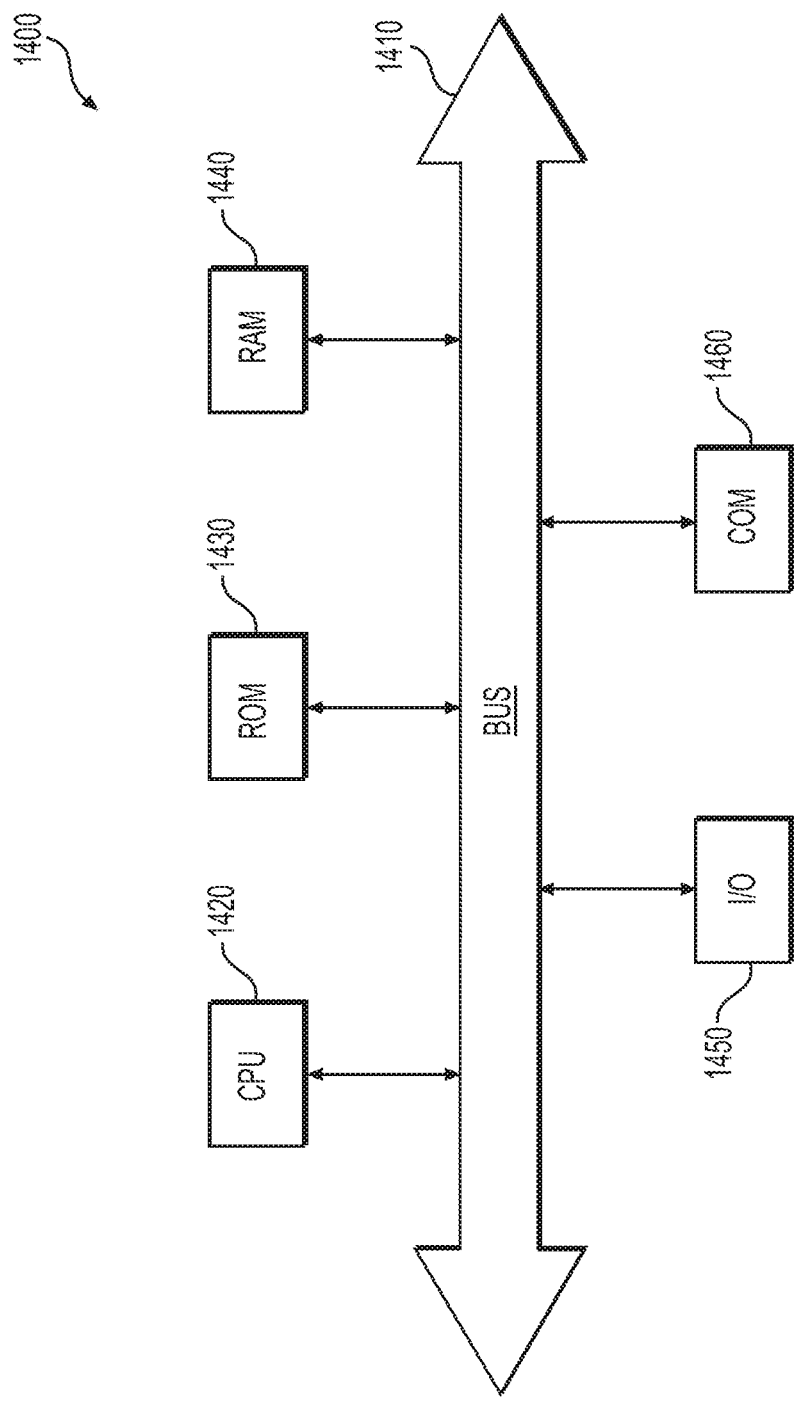
FIG. 12 depicts an example system that may execute techniques presented herein.

FIG. 12 is a simplified functional block diagram of a computer that may be configured as the monitored devices 105, monitoring systems 115, and/or model monitoring systems 120 executing techniques described herein, according to exemplary embodiments of the present disclosure. Specifically, in one embodiment, any of the monitored devices 105, monitoring systems 115, and/or model monitoring systems 120 may be an assembly of hardware 1400 including, for example, a data communication interface 1460 for packet data communication. The platform may also include a central processing unit ("CPU") 1420, in the form of one or more processors, for executing program instructions. The platform may include an internal communication bus 1410, program storage, and data storage for various data files to be processed and/or communicated by the platform such as ROM 1430 and RAM 1440, although the system 1400 may receive programming and data via network communications. The system 1400 also may include input and output ports 1450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of detecting failures in one or more models, the one or more models monitoring Internet-connected devices, comprising:
    receiving, from an Internet-connected devices monitoring system, training data, the Internet-connected devices monitoring system being configured to predict future maintenance needs and/or failures of at least one Internet-connected device;
    receiving, from the Internet-connected devices monitoring system, production data associated with the at least one Internet-connected device;
    determining that a data distance metric between the training data and the production data exceeds a first predetermined statistical distance threshold; and
    determining a risk level to be associated with the one or more models, the risk level based on the determination that the data distance metric exceeds the first predetermined statistical distance threshold.

2. The method of claim 1, wherein the data distance metric comprises a statistical distance metric.

3. The method of claim 1, wherein the data distance metric comprises a first statistical distance metric, and further comprising:
    determining a second statistical distance metric, the second statistical distance metric comprising a statistical distance between the training data and the production data, the second statistical distance metric being a different statistical distance metric from the first statistical distance metric; and
    determining the risk level by comparing the first statistical distance metric and the second statistical distance metric to the first predetermined statistical distance threshold.

4. The method of claim 3, wherein determining the risk level further comprises:
    determining a second predetermined risk threshold; and
    determining that the risk level is low risk if both the first statistical distance metric and the second statistical distance metric are below the first predetermined statistical distance threshold and the second predetermined statistical distance threshold.

5. The method of claim 4, further comprising:
determining that the risk level is high risk if either the first statistical distance metric or the second statistical distance metric exceed both the first predetermined statistical distance threshold and the second predetermined statistical distance threshold.

6. The method of claim 3, wherein the first statistical distance metric is a Jeffrey's Divergence and the second statistical distance metric is a Hellinger Distance.

7. The method of claim 1, further comprising:
generating an alert based on a determination that the risk level exceeds a predetermined threshold.

8. The method of claim 1, wherein the Internet-connected device is an industrial IoT device.

9. A system of detecting failures in one or more models; the one or more models monitoring Internet-connected devices, the system comprising:
a data storage device that stores instructions for detecting failures in the one or more models; and
a processor configured to execute the instructions to perform a method including
receiving, from an Internet-connected devices monitoring system, training data, the Internet-connected devices monitoring system being configured to predict future maintenance needs and/or failures of at least one Internet-connected device;
receiving, from the Internet-connected devices monitoring system, production data associated with the at least one Internet-connected device;
determining that a data distance metric between the training data and the production data exceeds a first predetermined statistical distance threshold; and
determining a risk level to be associated with the one or more models, the risk level based on the determination that the data distance metric exceeds the first predetermined statistical distance threshold.

10. The system of claim 9, wherein the data distance metric comprises a statistical distance metric.

11. The system of claim 9, wherein the data distance metric comprises a first statistical distance metric, and further comprising:
determining a second statistical distance metric, the second statistical distance metric comprising a statistical distance between the training data and the production data, the second statistical distance metric being a different statistical distance metric from the first statistical distance metric; and
determining the risk level by comparing the first statistical distance metric and the second statistical distance metric to the first predetermined statistical distance threshold.

12. The system of claim 11, wherein determining the risk level further comprises:
determining a second predetermined statistical distance threshold; and
determining that the risk level is low risk if both the first statistical distance metric and the second statistical distance metric are below the first predetermined statistical distance threshold and the second predetermined statistical distance threshold.

13. The system of claim 12, further comprising:
determining that the risk level is high risk if either the first statistical distance metric or the second statistical distance metric exceed both the first predetermined statistical distance threshold and the second predetermined statistical distance threshold.

14. The system of claim 11, wherein the first statistical distance metric is a Jeffrey's Divergence and the second statistical distance metric is a Hellinger Distance.

15. A non-transitory computer-readable medium storing instructions that, when executed by a computer, cause the computer to perform a method of detecting failures in one or more models, the one or more models monitoring Internet-connected devices, comprising:
receiving, from an Internet-connected devices monitoring system, training data, the Internet-connected devices monitoring system being configured to predict future maintenance needs and/or failures of at least one Internet-connected device;
receiving, from the Internet-connected devices monitoring system, production data associated with the at least one Internet-connected device;
determining that a data distance metric between the training data and the production data exceeds a first predetermined risk threshold; and
determining a risk level to be associated with the one or more models, the risk level based on the determination that the data distance metric exceeds the first predetermined statistical distance threshold.

16. The computer-readable medium of claim 15, wherein the data distance metric comprises a statistical distance metric.

17. The computer-readable medium of claim 15, wherein the data distance metric comprises a first statistical distance metric, and further comprising:
determining a second statistical distance metric, the second statistical distance metric comprising a statistical distance between the training data and the production data, the second statistical distance metric being a different statistical distance metric from the first statistical distance metric; and
determining the risk level by comparing the first statistical distance metric and the second statistical distance metric to the first predetermined statistical distance threshold.

18. The computer-readable medium of claim 17, wherein determining the risk level further comprises:
determining a second predetermined risk threshold; ad
determining that the risk level is low risk if both the first statistical distance metric and the second statistical distance metric are below the first predetermined statistical distance threshold and the second predetermined statistical distance threshold.

19. The computer-readable medium of claim 18, further comprising:
determining that the risk level is high risk if either the first statistical distance metric or the second statistical distance metric exceed both the first predetermined statistical distance threshold and the second predetermined statistical distance threshold.

20. The computer-readable medium of claim 17, wherein the first statistical distance metric is a Jeffrey's Divergence and the second statistical distance metric is a Hellinger Distance.

* * * * *